United States Patent [19]

Ingraham et al.

[11] Patent Number: 5,229,579
[45] Date of Patent: Jul. 20, 1993

[54] MOTOR VEHICLE HEATED SEAT CONTROL

[75] Inventors: Ronald D. Ingraham, Reed City, Mich.; Daniel D. Wilhelm, Westchester, Ohio

[73] Assignee: Nartron Corporation, Reed City, Mich.

[21] Appl. No.: 488,671

[22] Filed: Mar. 2, 1990

Related U.S. Application Data

[63] Continuation-in-part of Ser. No. 319,922, Mar. 6, 1989, Pat. No. 4,926,025, which is a continuation of Ser. No. 49,618, May 13, 1987.

[51] Int. Cl.⁵ .............................. H05B 1/02; H05B 1/00
[52] U.S. Cl. ................................ 219/202; 219/497; 219/505; 219/481
[58] Field of Search .............. 219/202, 203, 491, 494, 219/497, 499, 501, 505, 481

[56] References Cited

U.S. PATENT DOCUMENTS

| | | | |
|---|---|---|---|
| 2,698,893 | 1/1955 | Ballard | 219/202 |
| 3,842,243 | 10/1974 | Gregory | 219/501 |
| 4,546,238 | 10/1985 | Ahs | 219/497 |
| 4,554,439 | 11/1985 | Gross et al. | 219/497 |
| 4,581,522 | 4/1986 | Graham | 219/545 |
| 4,590,359 | 5/1986 | Mobius | 219/202 |
| 4,607,153 | 8/1986 | Ang | 219/202 |
| 4,700,046 | 10/1987 | Fristedt | 219/202 |
| 4,793,343 | 12/1988 | Cummings, Jr. et al. | 219/497 |
| 4,831,483 | 5/1989 | Matsumura et al. | |
| 4,926,025 | 5/1990 | Wilhelm | 219/202 |

FOREIGN PATENT DOCUMENTS

0293100 11/1988 European Pat. Off. .
0344869 6/1989 European Pat. Off. .

*Primary Examiner*—Mark H. Paschal

[57] ABSTRACT

A control for a resistive heating element embedded within a motor vehicle seat is disclosed. In one embodiment, a transistor is biased into conduction to energize the heating element when the temperature of the element is below a threshold that is adjusted by the vehicle operator. A fault sensing system monitors operation of the control unit and de-energizes the heating element if a fault is sensed. Sensed faults include both short circuits and undesirable open circuits. Power application to the resistive heating unit can be either pulsed or continuous. In one embodiment, once a fault is detected, the heating system cannot be re-energized until the vehicle ignition switch is turned off and then returned to its on position.

10 Claims, 5 Drawing Sheets

MOTOR VEHICLE HEATED SEAT CONTROL

CROSS REFERENCE TO RELATED APPLICATION

This application is a continuation-in-part of parent patent application Ser. No. 07/319,922, filed Mar. 6, 1989, now U.S. Pat. No. 4,926,025, which in turn is a continuation of U.S. patent application Ser. No. 06/049,618, filed on May 13, 1987, now abandoned.

TECHNICAL FIELD

The present invention relates to a control for energizing a heating element in a motor vehicle seat.

BACKGROUND ART

Electronically energized heated seats are now increasingly available in motor vehicles. The seat warms a motor vehicle operator before the motor vehicle's heating system becomes effective. A typical automobile heating system can take five to ten minutes after the engine begins running before the thermostat opens. A heating element embedded within a seat starts to heat the motorist as soon as current flows through the heating element. A heated seat option may include resistive elements embedded within only the driver seat, or in some instances both the driver and passenger seat.

One control system primarily designed for use in controlling the actuation or energization of a heated seat is disclosed in U.S. Pat. No. 4,546,238 to Ahs. The control system disclosed in this patent utilizes the fact that the resistance of the resistive heating element changes with temperature. By monitoring a voltage signal generated across the resistance element, the temperature of the resistance element is determined. comparator circuits in the control system energize and deenergize the resistive heating element to maintain the heating element temperature within a control range.

One potential problem that appears to have been overlooked in prior art heated seat systems is protection against electrical short circuits. A short in the control circuit of such a system can overheat the circuit and cause permanent damage. A large overcurrent might even cause the vehicle seat to catch on fire. Over current sensing and transient protection to prevent circuit damage due to high voltage spikes are necessary features in a reliable, safe heated seat system.

It is one object of the invention to provide a reliable, safe, and inexpensive control system for electronically energizing a resistive heating element in a motor vehicle seat.

DISCLOSURE OF THE INVENTION

A heating element control system constructed in accordance with the invention includes an energizing circuit coupled to a motor vehicle ignition switch to couple an energizing voltage across a heating element. A sensor senses the temperature of the heating element and generates a control signal output related to the temperature. A switch coupled to the control signal output controls current through the heating element as a function of the temperature of the heating element. Additionally a failure detection or sensing circuit deenergizes the heating element in the event of malfunction in the control system.

One malfunction that is sensed is a short circuit resulting in the energization signal from the ignition switch bypassing the heating element. This malfunction will cause the control system to overheat. An additional failure would be short circuit in the control system. so that the ignition signal is applied across the heating element at all times. This malfunction can result in high currents that dissipate excessive heat and may damage or even ignite the vehicle seat. High voltage transients that can exist in a vehicle ignition system disrupt or damage the control system. These transients are sensed and intercepted.

In a preferred embodiment of the invention, the switch element comprises a transistor which is biased on and off in a manner dependent upon the temperature of the resistive heating element. So long as the resistive heating element is below a set point temperature, controlled by the motor vehicle operator, the transistor cycles on and off energizing the heating element. The resistive heating element has a positive co-efficient that causes the heating element resistance to rise as the temperature rises. By monitoring this resistance, a sensing circuit controls the bias on the transistor as the temperature of the heating element rises and falls above and below the set or control temperature. When the heating element is heating up and transmitting energy to the seat in the form of joule heating energy, the transistor is cycled on and off at a frequency controlled by a timing circuit interposed between the transistor and the sensing circuit.

A control module mounted to a vehicle dashboard includes a light for illuminating the control system, a switch for actuation of the control system by the vehicle operator, and a variable control for adjusting a set or control temperature of the heated seat. In addition, light emitting diodes are utilized to apprise the vehicle operator of the status of the control and in particular indicate those intervals in which the resistive heating element is carrying a high current and transmitting heat to the seat.

In another embodiment, the invention includes the use of a separate sensor for monitoring temperature of the seat heating element. In a specific embodiment, that sensor comprises a thermistor.

Another aspect of this embodiment is the continuous application of electrical power to the heating element during those periods of time in which the sensor detects a need for raising the seat temperature.

In accordance with another specific aspect, failsafe protection is provided by circuitry for sensing not only short circuits within the system, but also open circuits which can have a damaging effect on the control circuitry, or which can contribute to seat overheating.

From the above it is appreciated that one object of the invention is a new and improved control system for energizing a heated seat heating element. This and other objects and advantages of the invention will become better understood from a detailed description of a preferred embodiment of the invention discussed below in conjunction with the accompanying drawings.

BEST MODE FOR CARRYING OUT THE INVENTION

Figure 1:
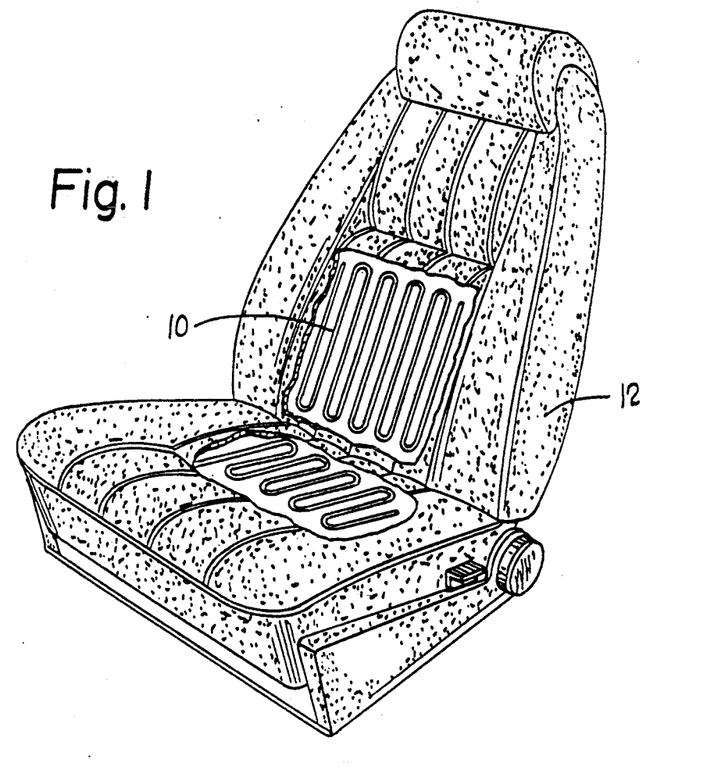
FIG. 1 is a perspective view of a motor vehicle seat having an embedded resistive heating element.

Turning now to the drawings, FIG. 1 shows an automobile seat having a resistive element 10 embedded within the seats. During periods of cold weather, the driver may actuate the heated seat to cause current to flow through the resistive element 10 and warm the seat prior to the automobile heater becoming effective.

An energization circuit 20 (FIG. 2) for activating the resistive element 10 includes an energization input 22 shown schematically coupled to the heating element 10. A control module 30 (FIG. 3) is mounted to the motor vehicle dashboard within convenient reach of the motor vehicle operator. Both the energization circuit 20 and the control module 30 are coupled to an ignition switch input 32 that energizes both the circuit 20 and control module 30 whenever the ignition key is switched on. Typically, this ignition input carries a regulated 12 volt signal from the vehicle battery.

The control module 30 includes a combined switch-/potentiometer control unit 34. A switch 34a can be opened and closed by the vehicle operator to activate and deactivate the heated seat option. A variable resistor 34b of the control switch unit 34 allows an adjustment of the heated seat temperature by the adjustment of a resistance. When the ignition signal input 32 is high (+12 v), a light bulb 36 coupled across the ignition signal and automobile ground is energized to illuminate the switch 34. When the switch contact 34a is closed, the 12 volt ignition signal at the input 32 is coupled to an output 40 labelled "switch output" in FIG. 3. This switch output is therefore a 12 volt regulated signal which is input to the energization circuit 20 when the switch 34a is closed.

The voltage at the input 40 is coupled across a combination of a resistor and a zener diode 42 having a break down voltage of approximately 16 volts. An output labelled VCC in FIG. 2 therefore follows the switched ignition voltage 40 unless this input exceeds 16 volts at which point the zener diode 42 breaks down and regulates the VCC voltage to 16 volts. The VCC signal is used to energize those remaining components of the energization circuit 20 that require an external power source.

Figure 2:
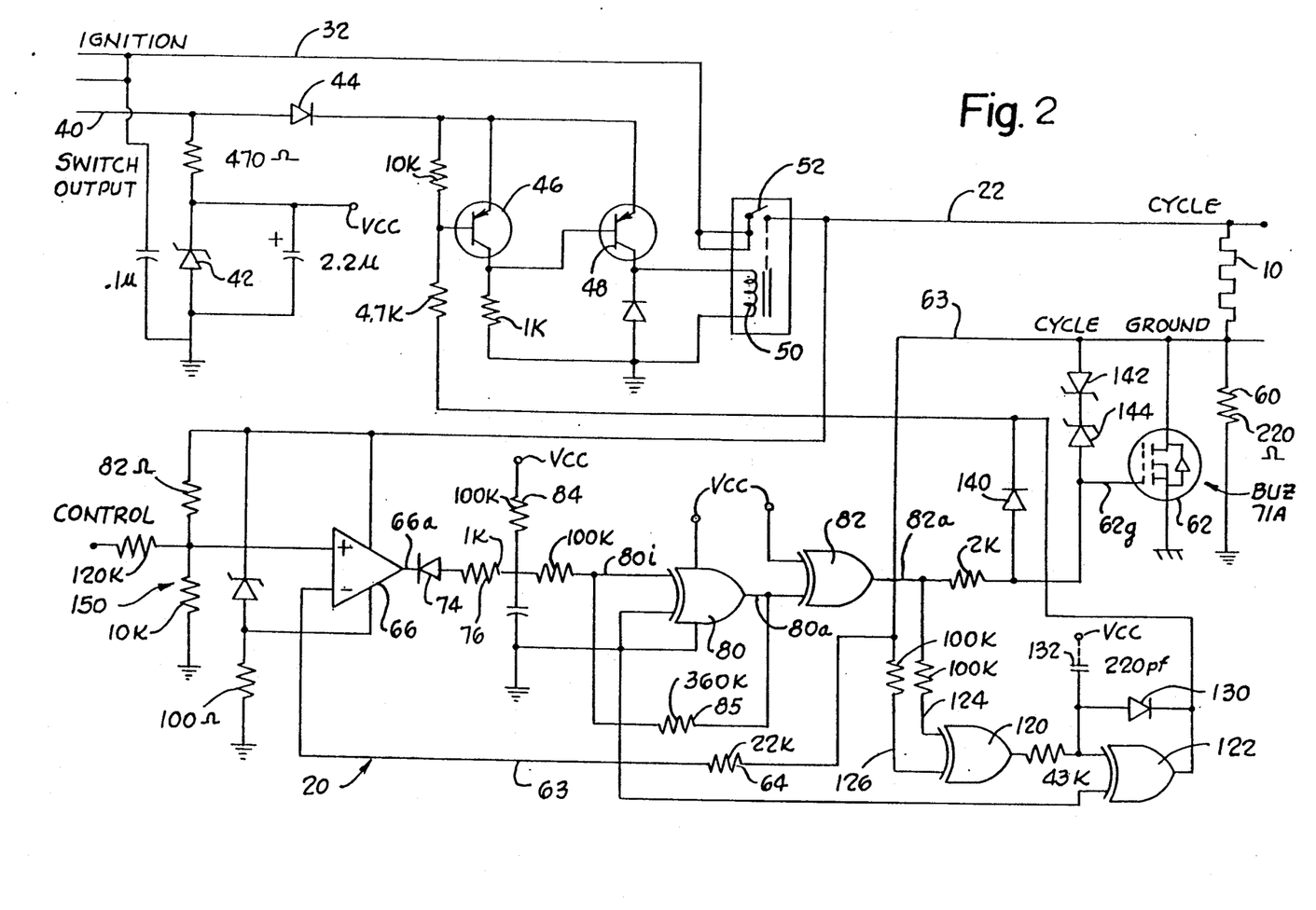
FIGS. 2 and 3 are schematic diagrams of a control system for energizing the resistive heating element of FIG. 1.
Figure 3:
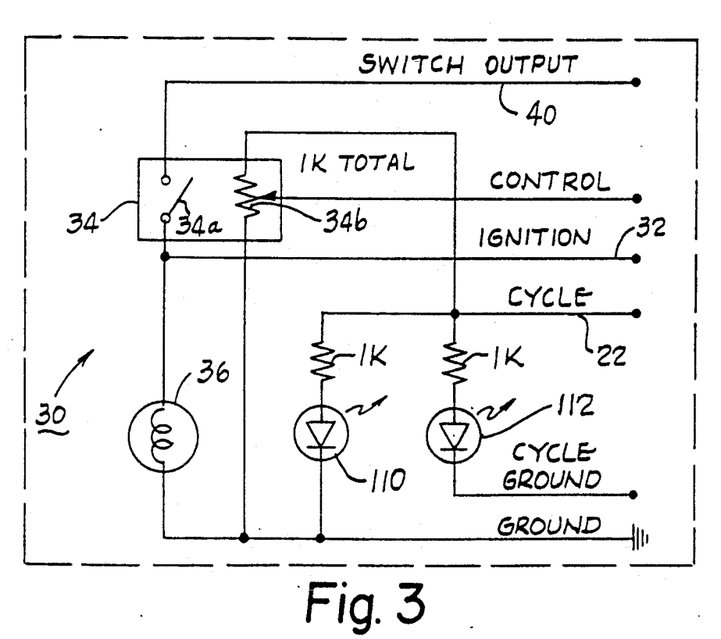

The voltage at the input 40 is also coupled to a diode 44 which prevents negative transients from reaching the circuit 20. Specifically, the diode 44 prevents those transients from reaching two switching transistors 46, 48. The voltage at the input 40 in combination with the biasing resistors coupled to the two transistors 46, 48 turns on the transistor 48 causing current to flow through a relay coil 50 closes a relay contact 52 and couples the ignition signal input 32 to the resistive element 10. The ignition voltage therefore energizes the heated seat whenever the relay contact 52 is closed.

As seen in FIG. 2, a negative side of the resistive heating element 10 is coupled to a 220 ohm resistor 60 and a field effect transistor 62 which together form a parallel path to ground for the energizing signal from the ignition 32. The current through the resistive heating element 10 depends upon the status of the field effect transistor 62. When this transistor is rendered nonconductive, it presents a high impedance path to the ignition voltage and a low level quiescent current through the heating element 10 is produced by the ignition voltage fier output 66a which discharges a capacitor 72 through the series combination of a diode 74 and resistor 76. The capacitor 72 discharges with a time constant dependent upon the capacitance of the capacitor 72 and a resistance of the resistor 76.

The voltage on the capacitor 72 is coupled to an input 80i of an exclusive OR gate 80. The output 80a from the gate 80 is coupled to a second exclusive OR gate 82. These gates in combination act as an invertor circuit so that a low signal at the input to the first gate 80 from the capacitor 72 causes a high signal at the output 82a from the second exclusive OR gate 82 is coupled to a gate input 62g of the field effect transistor 62. A high signal at the gate input 62g turns on the field effect transistor 62 and shorts the resistor 60 to increase the current passing through the heating element 10.

When the transistor 62 is rendered conductive, the voltage at the inverting input to the comparator amplifier drops below the CONTROL input. The output 66a goes high and the capacitor 72 charges through a resistor 84. The capacitor 72 charges at a rate determined by the RC time constant of the resistor 84 and capacitor 72.

A feedback resistor 85 connects the gate input 80i to the gate output 80a. The resistor 85 provides hysteresis to the operation of the gate 80. As the capacitor 72 discharges a lower capacitor voltage is needed to cause the gate 80 output to change state than is needed when the capacitor is charging. This is because when the capacitor 72 discharges, the resistor 85 tends to pull up the voltage on the input 80i and when the capacitor 72 is charging the resistor 85 tends to diminish the voltage at the input 80i. The crossover voltage of the gate input 80i is typically approximately VCC 2. As the capacitor 72 charges, it must charge to the value of (VCC 2)+10% to bring the input 80i to VCC 2. As the capacitor 72 discharges, it must discharge to a value of (VCC 2)−10% to drop the input 80i to VCC 2.

As the transistor 62 cycles on and off the heating element 10 heats up and due to its positive coefficient of resistance, the voltage across the resistance element 10 drops. As the element's resistance drops the voltage at the junction between the heating element 10 and resistor 60 drops below the reference or CONTROL input to the amplifier 66 with the transistor 62 non-conductive and the amplifier output 66a remains high. This maintains the charge on the capacitor 72 so that the invertor formed from the combination of the two exclusive OR gates 80, 82 keeps the transistor 62 turned off.

The quiescent or low level current through the heating element 10 is defined by the voltage across the heating element 10 and series connected resistor 60. The motor vehicle operator can open the switch 34a once the seat has been heated to remove even this low level current from the resistive heating element 10 but the heating affects with the switch 34a closed are minimal.

Returning to FIG. 3, two light emitting diodes 110, 112 indicate the operating condition of the energization circuit 20. A first light emitting diode 110 is coupled across the output from the relay switch 52 to indicate when the resistive element 10 is energized. A second light emitting diode 112 is coupled in parallel to the resistive heating element 10 and is forward biased to emit light only when the transistor 62 conducts. Stated another way, when the transistor 62 is not conducting, the voltage drop across the resistive heating element is too small to cause this second light emitting diode 112 to emit light.

Two additional exclusive OR gates 120, 122 (FIG. 2) check for a short circuit condition of either the transistor 62 or the heating element 10. The exclusive OR gate 120 has two inputs 124, 126. One input 124 is coupled to the gate input 62g of the transistor 62 through a resistor 128. A second input 126 is coupled to the junction between the heating element 10 and the resistor 60. In the event of a short circuit of the transistor 62 both inputs 124, 126 go low. This forces the output of the exclusive OR gate 120 low which also forces the output from the exclusive OR gate 122 low. The gate 122 in combination with a diode 130 and a capacitor 132 latch the output signal from the gate 120. The output from the gate 122 is coupled to the base input of the transistor 46. A low signal at the base of the transistor 46 turns that transistor on, raising the voltage at the transistor's collector, causing a base input to the transistor 48 to turn off state, the relay coil 50 is de-energized and the normally opened relay contact 52 opens.

A short circuit across the heating element 10 is also sensed and used to open the relay contact 52. A short across the heating element 10 at a time when the field effect transistor 62 is on means both inputs 124, 126 to the exclusive OR gate 120 are high. The output from the gate 120 then goes low as does the output from the gate 122. This turns on the transistor 46 to bias the transistor 48 off and open the relay contact 52.

Note that a low output from the gate 122 not only de-energizes the heating element 10 but turns off the transistor 62 by grounding the gate input 62g through a diode 140.

The short circuit protection prevents high, potentially dangerous currents from developing in the heating element 10. These high currents could potentially damage the circuit 20 and could also cause the seat 12 to catch on fire.

The gate input 62g of the transistor 62 and the juncture of the heating element 10 and resistor 60. The diode 142 limits the voltage across the gate of the transistor 62 to 7.5 volts. Transient protection for the transistor 62 is provided by the diode 144 which has a breakdown voltage of 47 volts.

Figures 4, 5:
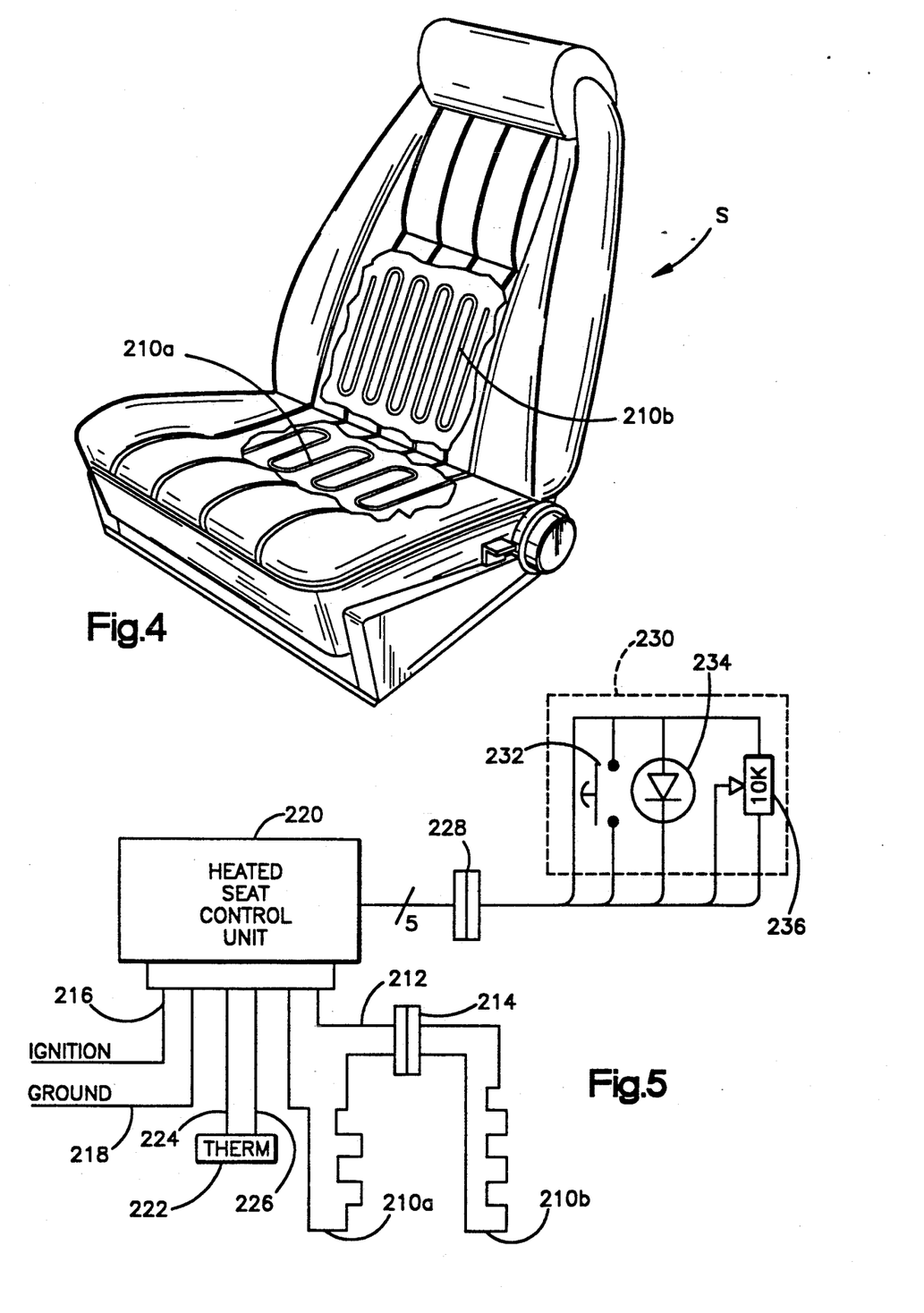
FIG. 4 is a perspective view of a motor vehicle seat having two embedded resistive heating elements.
FIGS. 5, 6 and 7 are schematic diagrams of a control system for energizing the resistive heating elements of FIG. 4.

The comparator amplifier 66 is protected against transients by a resistor network 150 coupled to the non-inverting comparator input. The network 150 allows the voltage output from the variable resistor 34b to control the input to the comparator while preventing transients from reaching the comparator amplifier 66. An alternate transient suppression circuit is illustrated in FIG. 4. In the alternate circuit the resistor network 150 (FIG. 2) is replaced with two diodes 152, 154 which block transients from reaching the comparator amplifier.

In operation, the status of the gate input 62g determines whether the heating element 10 carries a high level or quiescent current. The gate input 62g is in turn controlled by the voltage across the resistor 60 which as noted previously depends on the resistance and therefore temperature of the heating element 10. The transistor 62 cycles on and off at a rate controlled by the RC time constant of the capacitor 72 and resistor 84 until the heating element 10 reaches a reference temperature controlled by the operator adjusted CONTROL input to the comparator 66. When this occurs the transistor 62 is turned off until the heating element temperatures against falls below the reference.

FIG. 4 illustrates a vehicle seat S having an electric resistance heater. The heating elements are embodied by resistance elements 210a and 210b. The resistance element 210a is embedded in the seat portion, while the resistance element 210b is embedded in the backrest portion.

The electrical control system for operating the electrical resistance elements 210a, 210b is shown generally in FIG. 5. FIG. 5 illustrates the resistance heating elements 210a, 210b a heated seat control unit 220 and a control panel 230. Electrical energy for heating the resistance elements 210a, 210b, is furnished from the control unit 220 over a lead generally indicated as 212, and a connector generally indicated as 214. The control unit 220 receives an ignition input signal from the battery of the vehicle over a lead 216. The ignition input is present whenever the ignition key of the vehicle is turned on.

A ground lead 218 is also coupled to the control unit 220.

A thermistor 222 is located near the resistance element 210a, in order to sense the temperature of that resistance element. The thermistor 222 is coupled to the control unit 220 by a pair of leads 224, 226.

The control unit 220 is coupled in parallel, via a connector 228, to the control panel 230.

More specifically, control panel elements which are coupled to the control unit 220 are an on/off switch 232, a light emitting diode 234, and a potentiometer 236.

When the motor vehicle operator momentarily depresses the on/off switch 232, the heating of the resistance heating elements in the seat is initiated. The operator can also set the potentiometer 236, which determines the temperature at which heating of the seat is maintained. Regulation of electrical energy to effect maintenance of seat temperature at the set level is effected by cycling the electric power on and off. While the electric power is being applied to the resistance heating element, the light emitting diode 234 is lighted. When no electric power is being applied to the resistance heating elements, the light emitting diode 234 is not lighted.

Figure 6:
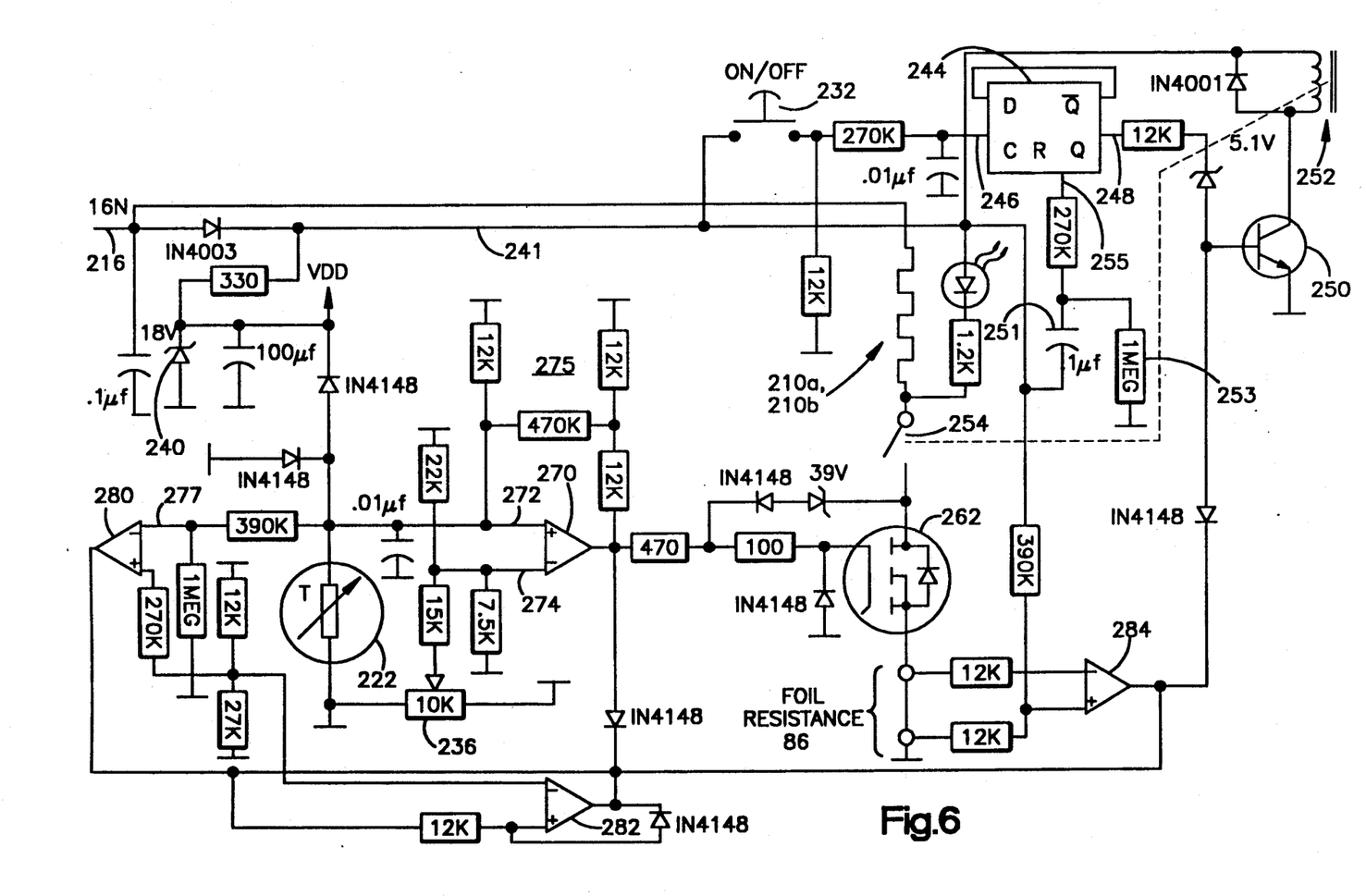

The control unit 220 is illustrated schematically in FIG. 6.

Figure 7:
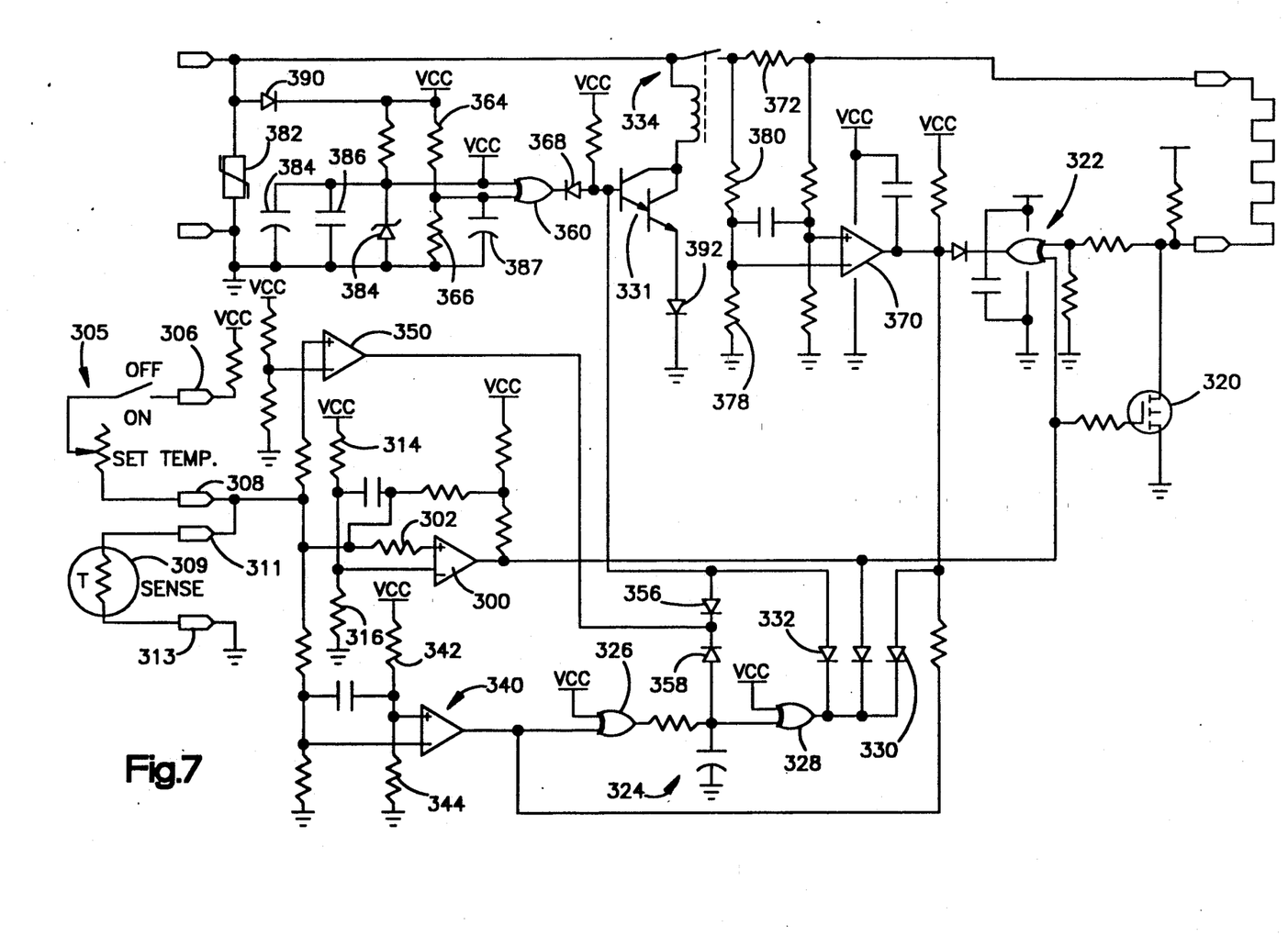

In FIG. 6, the ignition signal appearing at the lead 216 in the upper left portion of FIG. 6 is coupled to a zener diode 240 which supplies a regulated voltage VCC to the remaining circuitry shown in FIG. 7. The ignition input is applied, over a lead 241, to one side of the on/off switch 232. Momentary closure of the switch 232 toggles a flip-flop 244. When the ignition switch of the vehicle is closed, and the switch 232 is lost momentarily, a clock input 246 to the flip-flop goes high, causing the Q output from the flip-flop to change state. When the output from the flip-flop, appearing at a lead 248, goes high, a transistor 250 turns on.

When the ignition switch is first turned on, the combination of a capacitor 251 and a resistor 253 applies a momentary high reset input to the flip-flop 244, appearing at a lead 255. This assures that the Q output of the flip-flop is low upon power up of the circuit.

When the transistor 250 turns on, it energizes a relay coil 252 which closes a relay contact 254 to which the coil is coupled.

The circuit includes the thermistor 222 for monitoring temperature of the heated seat and controllably setting the state of a field effect transistor 262. When the field effect transistor 262 is energized, electric current passes through the resistive seat heating elements which are coupled in series with the field effect transistor 262.

For simplicity, both resistive heating elements 210a, 210b are illustrated in FIG. 6 as the same heating element.

In operation, when the relay contact 254 is first closed, the thermistor 222 is typically at a low temperature. Under such conditions, the circuit of FIG. 7 will attempt to turn on the field effect transistor 262. At low temperature the thermistor's resistance is high, so that the voltage drop across the thermistor is also high.

A comparator amplifier 270 has a non-inverting input 272 coupled to the thermistor 222. An inverting input 274 of the comparator amplifier 270 is derived from an adjustable input from the potentiometer 236, which includes a variable resistor. By adjusting the potentiometer 236, the reference input 274 can be adjusted to control the field effect transistor actuation set point.

As noted above, at low temperature, the resistance of the field effect transistor is high, so that an output from the comparator 270 will typically high. This turns on the gate to the field effect transistor 262 and causes current to flow through the heating elements 210a, 210b. As time passes, joule heating due to electric current flow in the heating elements 210a, 210b will cause the temperature of the thermistor 222 to rise. Eventually, the voltage at the input 272 of the comparator 270 drops below that of the reference input 274. This condition causes the output from the comparator 270 to go low. The output of the comparator 270 going low turns off the field effect transistor 262, which interrupts the application of electrical heating energy to the heating elements 210a, 210b.

A feedback loop formed by a resistor network, generally designated as 275 and located directly above the comparator 270 in FIG. 6, produces a hysteresis effect to prevent the transistor 262 from toggling on and off at a rapid rate. This hysteresis changes the voltage point at which the output from the comparator 270 changes state. Thus, when the heating elements 210a, 210b are energized, for example, the hysteresis circuit assures that the heating elements are energized for a minimum of a few seconds. In similar fashion, when the current is removed from the heating elements, the hysteresis circuit 275 assures that the field effect transistor 262 is not again activated for a certain delay period of a few seconds.

The circuit of FIG. 6 includes circuitry for preventing catastrophic failure of the system due to either an open circuit or a short circuit situation.

As an example of an open circuit causing failure, in the event that the thermistor circuit opens due to a loose connection or the like, the input 272 to the comparator 270 would stay high, causing the output from the comparator 270 to remain high as well. This would cause the heating elements 210a, 210b to become overly hot.

To avoid such a situation, a comparator 280 is provided, having an inverting input 277 coupled to the input 272 of the comparator 270 by way of a resistor. An open circuit condition will cause this voltage to rise well above the corresponding voltage in a properly functioning circuit, and will cause a low output from the comparator 280. This low output is coupled as one input to an additional comparator amplifier 282. The output from the amplifier 282 also goes low in response to the output from the amplifier 280.

The output of the comparator amplifier 282 is coupled to an output from the comparator amplifier 70 to turn off the field effect transistor 262. In addition, this output is coupled to the gate input to the transistor 250.

This deactivates the transistor 250 and de-energizes the relay coil 252 and opens the contact 254. An additional problem can occur if one or both of the heating elements 210a, 210b is short circuited. In the event of such a short, giving rise to a potential failure, the current through the field effect transistor 262 will rise considerably. A piece of foil 286 is incorporated into the circuit below the field effect transistor in order to sense rising current conditions in the circuit. The resistance of the foil increases as current rises and the foils' temperature also increases. A rise in the resistance of the foil causes a low output from a differential amplifier 284. This low output deactivates both the field effect transistor 262 and the transistor 250. Thus, the circuit also includes circuitry for sensing a short circuit and for deactivating or interrupting the application of electric power to the heating elements in response to the detection of the short circuit.

It should be noted that, in the event a short circuit of open circuit condition is encountered, the seat heater circuit cannot be reactivated unless the ignition signal is toggled off and then on. Mere reclosure of the switch 232 will not alone re-arm the circuit. This is true because, once either the amplifier 252 or the amplifier 254 goes low at its output, this condition is latched and can only be changed by toggling the ignition switch resulting in removal and reapplication of the ignition signal at the lead 216.

A further embodiment of a control circuit for an automotive heated seat is illustrated schematically in FIG. 7.

A comparator 300 senses the voltage at an input 302. The voltage is established by the setting of a user-adjustable control 305, which is located between points 306 and 308, and a thermistor 309 connected from point 311 to point 313. A fixed reference potential is produced by a combination of resisters 314, 316. When the thermistor resistance is high, indicating a cold seat temperature, the comparator 300 output goes high, thereby gating a field effect transistor 320 to its on, or conductive, condition. Low thermistor resistance, corresponding to low voltage, turns the transistor 320 to its off, or non-conductive, state.

An exclusive OR gate 322 monitors the gate and driven voltages of the transistor 320. If the transistor 320 gate goes low and the drain fails to go high (indicating a shorted transistor 320), the output of the OR gate 322 goes low. This pulls one input of an OR gate 326 to a low state. The output of this OR gate then goes high, causing the output of an OR gate 328 to go low. A diode 330 then clamps the OR gate input low, thus latching the circuit 324. A transistor 331 is then turned off via a diode 332. This causes a relay 334 to open, shutting off power to the heater system.

This same function occurs if the gate of the transistor 320 goes high and the drain stays high, indicating a shorted heater element, for example. The relay opens the circuit to prevent damage.

If a comparator 340 sees an input too high above the level set by the voltage at the resistors 342, 344, its output goes low, which again sets the latch and turns off the relay 334.

This would occur, for example, if the thermistor or its wiring was to open-circuit, or the user control or wiring shorted to itself or to the battery.

A comparator 350 senses an opening of the user control switch (input voltage goes low). Again, a low output will clamp the base of the transistor 331 by way of a diode 356, thus opening the relay 334. This serves as the primary on/off control for the system. A diode 358 resets the latch circuit when the user switch is opened.

An exclusive OR gate 360 is an over-voltage monitor. One input is connected to voltage VCC, while the other input ties to the battery (ignition) via a divider including resistors 364, 366. This output is normally high. Should the input voltage increase to the threshold level of the gate device, the output will go low which turns off the transistor 331 by way of a diode 368.

A comparator 370 functions as a current limiter in conjunction with a sensing resistor 372. Note that a resistor 376 does not have a counterpart in the string of resistors including resistors 378, 380. This allows the threshold to change slightly as battery voltage changes. This in turn compensates for the variation in "normal" current through the heater element as a function of battery voltage change.

The power supply is protected against transients by a diode 382 which is an MOV. A diode 384 comprises a zener diode, which regulates the operating voltage VCC. Two capacitors 384, 386 provide noise filtration, as does capacitor 387 on the voltage sensing input of the exclusive OR gate 360. All other capacitors in the system are used for similar purposes.

A diode 390 protects against reverse voltage, as does another diode 392. The location of the diode 392 in the emitter of the transistor 331 also raises the conductive threshold of the base of the transistor 331, to insure positive turn-off when any of the clamp diodes are pulled low.

The present invention has been described with a degree of particularity. It is the intent, however, that the invention include all modifications and alterations of the disclosed design falling within the spirit or scope of the appended claims.

We claim:

1. A method for energizing a resistive heating element of a motor vehicle seat, by use of direct current, said method comprising the steps of:
   a) closing a user actuated switch to apply a direct current, vehicle battery energization voltage to an energization switch coupled across a seat heating circuit including the resistive heating element and a DC controlled semi-conductor switching device for controlling direct current flow through the resistive heating element;
   b) sensing the temperature of the resistive heating element by the use of a temperature sensor and generating a sensed signal related to the sensed temperature of the resistive heating element;
   c) producing a control signal related to a user control input corresponding to a desired vehicle seat temperature;
   d) comparing the control signal with the sensed signal by use of DC based circuitry and, if the comparison indicates that the temperature of the resistive heating element should be increased to cause the seat to reach the desired temperature, applying direct current continuously through the heating element by activating the switching device to cause direct current flow through the resistive heating element until the temperature of the motor vehicle seat reaches the desired temperature as indicated by the sensed signal;
   e) producing and monitoring by use of DC based circuitry a fault signal indicating one of a heating element short circuit or an undesirable open circuit, and
   f) if the fault signal indicates a short circuit across the resistive heating element, or an undesirable open circuit, removing the direct current application from the resistive heating element.

2. A system for controllably heating a vehicle seat, by use of direct current, said system comprising:
   a) a resistive heating element adapted for inclusion in the vehicle seat;
   b) a seat heater control unit comprising DC based circuitry for controlling application to the resistive heating element of a substantially direct current which is applied to said seat heater control unit;
   c) circuitry for selectively applying said direct current to said control unit by means of a switch of the vehicle;
   d) a user actuated temperature select device for producing a reference electrical signal representing a desired vehicle seat temperature;
   e) said control unit comprising:
      i) a DC controlled semi-conductor switching device in series with said resistive heating element;
      ii) a temperature sensor separate from said resistive heating element;
      iii) a DC based comparator for comparing the reference signal with the sensed temperature for actuating said switching device to provide a continuous application of direct current flow to said resistive heating element in response to said comparison indicating that the sensed temperature is less than the temperature represented by the reference signal.

3. The apparatus of claim 2, wherein: said temperature sensor comprises a thermistor.

4. The apparatus of claim 2, further comprising:
   a) DC based circuitry for sensing excessive current flow through said resistive heating element, and
   b) DC based circuitry for interrupting application of electrical power to said resistive heating element in response to sensing of said excessive current flow.

5. The apparatus of claim 4, wherein: said circuitry for sensing excessive current flow comprises a foil resistor.

6. The apparatus of claim 2, further comprising:
   a) DC based circuitry for detecting an undesirable open circuit within said seat heater control unit, and
   b) circuitry for interrupting application of electric power to said resistive heating element in response to sensing of said undesirable open circuit.

7. The apparatus of claim 2, further comprising:
   a) DC based circuitry for detecting a malfunction in said seat heater control unit, including a malfunction associated with said switching device, and
   b) circuitry responsive to detection of a malfunction for disabling further operation of said seat heater control unit, and for re-enabling said operation only after said power switch is turned off and then on again.

8. A vehicle seat heater comprising:
   a) a resistive heating element adapted for placement in a vehicle seat;
   b) circuitry for controlling application of DC electric power to said resistive heating element;
   c) DC based circuitry for detecting a short circuit in said control circuitry;

d) DC based circuitry for detecting an undesirable open circuit in said control circuitry;
e) circuitry responsive to detection of a short circuit for interrupting application of electric power to said resistive heating element, and
f) circuitry responsive to the detection of an undesirable open circuit for interrupting application of electrical power to said resistive heating element.

9. The heater of claim 8, wherein said circuitry for detecting a short circuit includes a foil resistor.

10. Circuitry for controlling application of DC electric power to a resistive heating element for a vehicle seat, said circuitry comprising:
a) ignition control circuitry associated with an ignition circuit of the vehicle for producing an enabling signal when the power is turned on;
b) a seat heater control unit including circuitry responsive to the enabling signal for continuously applying DC electrical power to the resistive heating element, said control unit including temperature responsive feedback circuitry for sensing resistive heating element temperature and regulating the application of DC electric power to the resistive heating element in response to the sensed temperature;
c) circuitry for detecting a malfunction in the control unit by the use of DC, and
d) circuitry for interrupting electrical power application to the resistive heating element in response to said malfunction detection, and for reapplying electrical power to the resistive heating element only after turning off said ignition circuit and then returning the ignition circuit to its on condition.

* * * * *